United States Patent
Lee

(10) Patent No.: US 8,507,157 B2
(45) Date of Patent: Aug. 13, 2013

(54) MASK FOR HARDENING SEALANT AND METHOD OF MANUFACTURING FLAT DISPLAY DEVICE USING THE MASK

(75) Inventor: Kyung-Jun Lee, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 0 days.

(21) Appl. No.: 13/172,190

(22) Filed: Jun. 29, 2011

(65) Prior Publication Data

US 2012/0048462 A1   Mar. 1, 2012

(30) Foreign Application Priority Data

Aug. 31, 2010   (KR) .................. 10-2010-0084893

(51) Int. Cl.
*G03F 1/50* (2012.01)
*H01J 9/26* (2006.01)
*H01J 9/32* (2006.01)

(52) U.S. Cl.
USPC .............................................. 430/5; 445/25

(58) Field of Classification Search
USPC .............. 430/5, 321, 394; 349/153; 445/25, 445/24
See application file for complete search history.

(56) References Cited

U.S. PATENT DOCUMENTS

| 6,743,571 B1 * | 6/2004 | Hill et al. ................... 430/306 |
| 7,724,341 B2 * | 5/2010 | Kondo et al. ................ 349/153 |
| 2008/0111479 A1 | 5/2008 | Choi et al. |
| 2011/0051069 A1 * | 3/2011 | Yamada et al. .............. 349/153 |

FOREIGN PATENT DOCUMENTS

| JP | 2003-289041 | 10/2003 |
| KR | 10-0745345 | 7/2007 |
| KR | 10-2008-0033799 | 4/2008 |
| KR | 10-0824531 | 4/2008 |

* cited by examiner

*Primary Examiner* — Stephen Rosasco
(74) *Attorney, Agent, or Firm* — Robert E. Bushnell, Esq.

(57) ABSTRACT

In a mask for hardening a sealant and a method of manufacturing a flat display device using the mask, the mask includes a main body in which a transmission slit is formed, and a partial shielding portion partially shielding the transmission slit. The transmission slit corresponds to the shape of the sealant enclosing a light-emitting portion formed on a substrate. By using such a mask, the partial shielding portion covers a portion where the amount of laser irradiation is relatively large, thus hardening the sealant uniformly across the entire regions of the sealant, and thus guaranteeing a stable encapsulating structure.

19 Claims, 7 Drawing Sheets

MASK FOR HARDENING SEALANT AND METHOD OF MANUFACTURING FLAT DISPLAY DEVICE USING THE MASK

CLAIM OF PRIORITY

This application makes reference to, incorporates the same herein, and claims all benefits accruing under 35 U.S.C. §119 from an application earlier filed in the Korean Intellectual Property Office on Aug. 31, 2010 and there duly assigned Serial No. 10-2010-0084893.

BACKGROUND OF THE INVENTION

1. Field of the Invention

The present invention relates to a mask for hardening a sealant and a method of manufacturing a flat display device using the mask, and more particularly, to a mask for hardening a sealant, which mask can suppress sealing failure caused by a deviation in exposure according to a region of the sealant, and a method of manufacturing a flat display device using the mask.

2. Description of the Related Art

A flat display device, such as an organic light-emitting display device, due to its operating nature, can be made to have thin thickness and flexibility, thus being much researched.

In the organic light-emitting display device, however, a light-emitting portion deteriorates by permeation of moisture and water. To prevent the permeation, the organic light-emitting display device needs an encapsulating structure which protects the light-emitting portion by sealing the light-emitting portion.

The encapsulating structure is usually a structure which covers a glass substrate where the light-emitting portion is formed with the encapsulating substrate, and which seals a gap between the glass substrate and the encapsulating substrate with a sealant, such as frit. That is, frit is applied around the light-emitting portion formed on the glass substrate, is covered thereon with the encapsulating substrate, and is then hardened by laser irradiation, thereby completing sealing.

When the frit enclosing the light-emitting portion, that is, the sealant, is hardened by laser irradiation, a large deviation in the amount of energy for laser irradiation from region to region may result in sealing failure. In other words, an insufficient amount of energy may hinder proper sealant hardening, leading to sealing failure; whereas an excessive amount of energy may generate a large amount of bubbles on the surface of the sealant, also resulting in sealing failure.

Therefore, the laser has to be uniformly irradiated across all the regions of the sealant. However, the problem is that the amount of laser irradiation inevitably differs between a straight line portion and a corner portion given that the sealant is approximately in a square shape. In other words, the sealant generally encloses the light-emitting portion formed on the glass substrate in the shape of a square. Thus, during hardening of straight line portions corresponding to four sides, a laser irradiator can uniformly irradiate the laser onto these portions while moving at a constant speed. During hardening of corner portions corresponding to connecting portions between the four sides, however, the laser irradiator slows down when compared to hardening the straight line portions, thereby increasing the amount of laser irradiation. As a result, when the amount of laser irradiation is set based on the straight line portions, bubbles are generated on the surface of the sealant due to the excessive amount of laser irradiation onto the corner portions, leading to sealing failure.

Accordingly, there is a need for a method for solving the foregoing problem by reducing deviation in the amount of laser irradiation from region to region in the sealant.

SUMMARY OF THE INVENTION

The present invention provides a mask for hardening a sealant, which mask can solve a sealing failure problem by reducing deviation in the amount of laser irradiation from region to region in the sealant, and a method of manufacturing a flat display device using the mask.

According to an aspect of the present invention, a mask for hardening a sealant comprises: a main body in which a transmission slit is formed, the transmission slit corresponding to a shape of the sealant enclosing a light-emitting portion formed on a substrate, and a partial shielding portion for partially shielding the transmission slit.

The transmission slit may include a plurality of straight line portions and corner portions which connect the straight line portions, and the partial shielding portion may be provided to the corner portions.

The corner portions may be in a round shape.

The partial shielding portion may include a plurality of bar patterns provided in the corner portions of the transmission slit.

The plurality of bar patterns may be shaped such that a width of a side close to the light-emitting portion is substantially equal to the width of an opposite side, or the plurality of bar patterns may be shaped such that a width of a side close to the light-emitting portion is less than the width of an opposite side.

A width of the bar pattern disposed in the center of the corner portion among the plurality of bar patterns may be larger than widths of the remaining bar patterns.

The partial shielding portion may include a low-transmissivity layer which reduces transmissivity by covering the transmission slit in the corner portions.

The low-transmissivity layer may be shaped such that a thickness of a side close to the light-emitting portion is substantially equal to the thickness of an opposite side, or the low-transmissivity layer may be shaped such that a thickness of a side close to the light-emitting portion is larger than the thickness of an opposite side.

According to another aspect of the present invention, a method of manufacturing a flat display panel comprises: applying a sealant around a light-emitting portion formed on a substrate and covering the sealant with an encapsulating substrate; installing a mask for hardening the sealant on the encapsulating substrate, the mask comprising a transmission slit which corresponds to a shape of the sealant; and hardening the sealant by irradiating laser onto the sealant through the transmission slit; wherein the mask partially shields the transmission slit.

The transmission slit may include a plurality of straight line portions and corner portions which connect the straight line portions, and the partial shielding portion may be provided in the corner portions.

The corner portions may be in a round shape.

The partial shielding portion may include a plurality of bar patterns provided in the corner portions of the transmission slit.

The plurality of bar patterns may be shaped such that a width of a side close to the light-emitting portion is substantially equal to the width of an opposite side, or the plurality of bar patterns may be shaped such that a width of a side close to the light-emitting portion is smaller than the width that of an opposite side.

A width of the bar pattern disposed in the center of the corner portion among the plurality of bar patterns may be larger than widths of the remaining bar patterns.

The partial shielding portion may include a low-transmissivity layer which reduces transmissivity by covering the transmission slit in the corner portions.

The low-transmissivity layer may be shaped such that a thickness of a side close to the light-emitting portion is substantially equal to the thickness of an opposite side, or the low-transmissivity layer may be shaped such that a thickness of a side close to the light-emitting portion is larger than the thickness of an opposite side.

With the mask for hardening a sealant and the method of manufacturing a flat display device using the mask according to the present invention, a deviation in the amount of laser irradiation from region to region of the sealant can be reduced, thereby suppressing sealing failure and thus guaranteeing a stable encapsulating structure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, exemplary embodiments of the present invention will be described with reference to the accompanying drawings.

Figure 1:
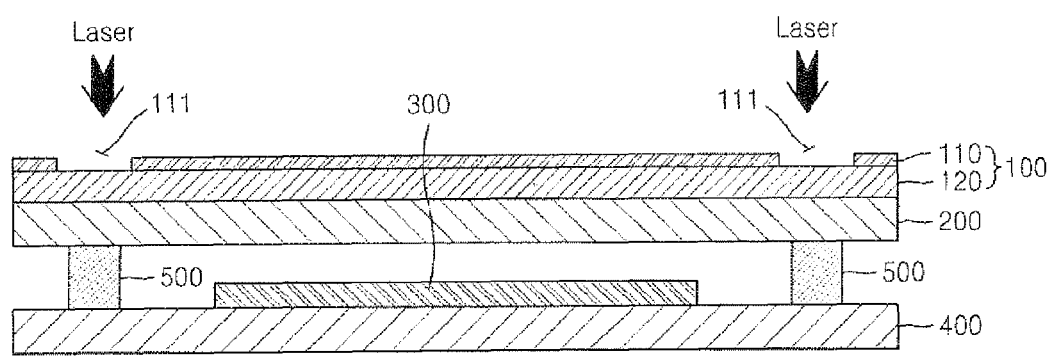
FIG. 1 is a cross-sectional view for describing a method of manufacturing a flat display device using a mask for hardening a sealant according to an embodiment of the present invention.
Figure 2:
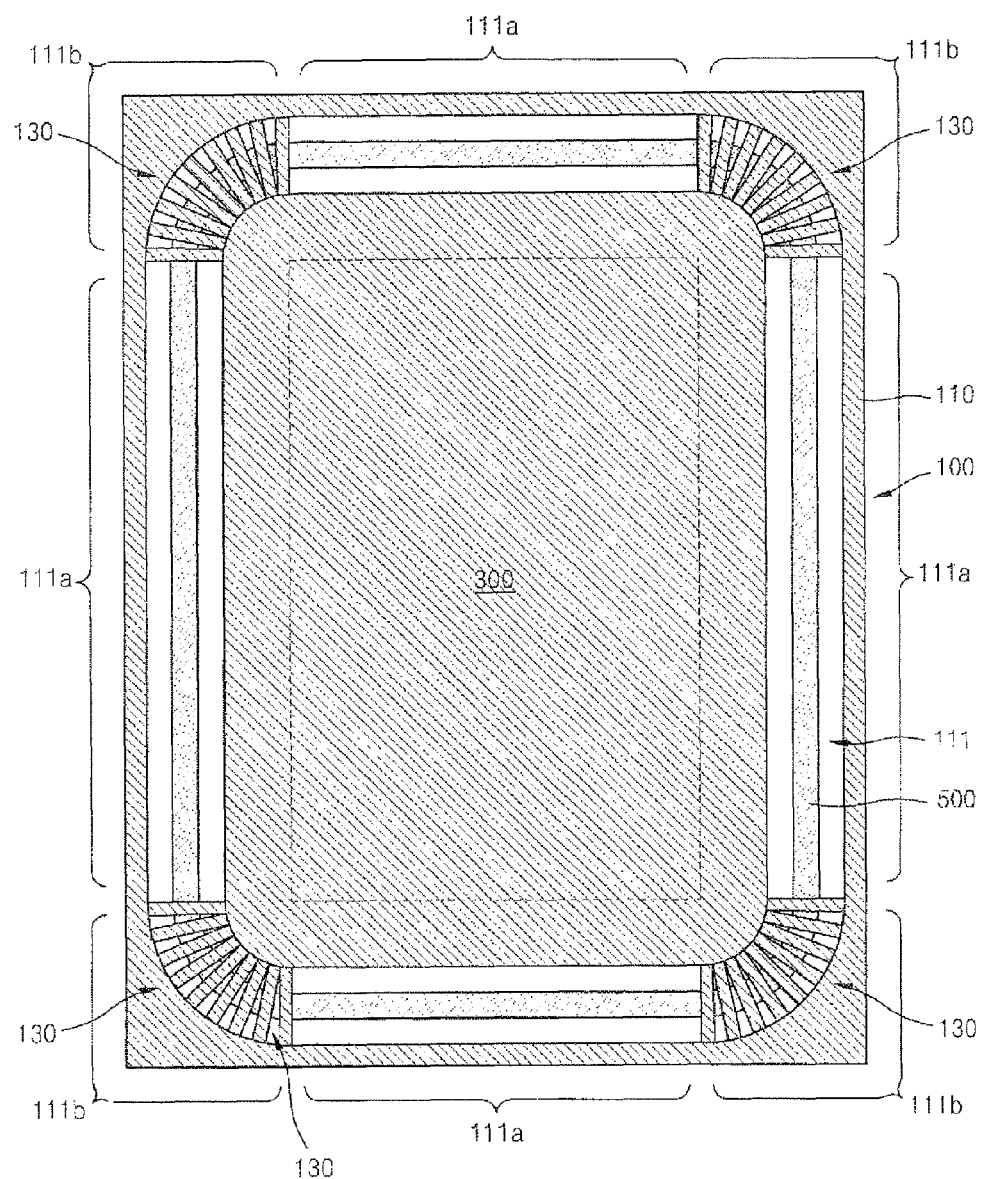
FIG. 2 is a plan view of FIG. 1.

FIG. 1 is a cross-sectional view for describing a method of manufacturing a flat display device using a mask for hardening a sealant according to an embodiment of the present invention, and FIG. 2 is a plan view of FIG. 1.

As shown in FIGS. 1 and 2, the flat display device according to the current embodiment of the present invention includes a substrate 400, a light-emitting portion 300 formed thereon, an encapsulating substrate 200 for covering the light-emitting portion 300, a sealant 500 for sealing a gap between the substrate 400 and the encapsulating substrate 200 by enclosing the light-emitting portion 300.

For the sealant 500, a frit may be used. The frit is a glass member which serves as a glass raw material, and is hardened by laser exposure. Thus, when the frit as the sealant 500 is applied to the substrate 400 and is covered thereon with the encapsulating substrate 200, and then laser is irradiated to a corresponding region, the fit is hardened, thus firmly sealing the gap between the substrate 400 and the encapsulating substrate 200.

In laser irradiation for hardening the sealant 500, the sealant hardening mask 100 is used to guide the laser so as to correctly irradiate the sealant 500.

The sealant hardening mask 100 includes a main body in which a transmission slit 111 for passing laser therethrough is formed. That is, the main body is structured such that a shielding pattern 110 is formed on a transparent base 120 and is formed in the transmission slit 111. Thus, the laser irradiated from a laser irradiator (not shown) is irradiated onto the sealant 500 through the transparent slit 111. Naturally, the transmission slit 111 is formed in correspondence to the shape of the sealant 500.

In round-shaped corner portions 111b (FIG. 2) of the transmission slit 111, a partial shielding portion 130, including bar patterns to partially shield the laser, is formed. In other words, the transmission slit 111 is formed approximately in a square shape matching the shape of the sealant 500 enclosing the light-emitting portion 300, such that the transmission slit 111 is completely open in straight line portions 111a corresponding to four sides, and the partial shielding portions 130 are formed at the corner portions 111b corresponding to the four corners so as to partially shield the laser.

Consequently, the amount of laser transmission is reduced by the partial shielding portion 130 at the corner portions 111b when compared to the straight line portions 111a, whereby the amount of laser irradiation onto corresponding regions of the sealant 500 in the corner portions 111b is also reduced. As stated above, the amount of laser irradiation onto the corner portions 111b is larger than the amount of laser irradiation onto the straight line portions 111a due to reasons, such as deceleration of the laser irradiator (not shown) at the corner portions 111b. However, by partially covering the corner portions 111b with the partial shielding portion 130, the amount of laser irradiation onto the corner portions 111b is reduced almost to that onto the straight line portions 111a. That is, by covering the corner portions 111b onto which an amount of laser is irradiated, that amount being larger than the amount of laser irradiated onto the straight line portions 111a, the corner portions 111b being covered by the partial shielding portion 130, the level of the amount of laser irradiation onto the corner portions 111b is adjusted to a level similar to the level of the amount of laser irradiation onto the straight line portions 111a, thus reducing a deviation in the amount of laser irradiation.

Therefore, by using the sealant hardening mask 100, the amount of laser irradiation passing through the transmission slit 111 is adjusted to a uniform level across the entire regions of the sealant 500, thereby solving a problem such as the generation of bubbles caused by an excessive amount of laser irradiation onto the corner portions 111b.

The flat display device may be manufactured using the sealant hardening mask 100 as described below.

First, the light-emitting portion 300 is formed on the substrate 400, and the sealant 500 is applied around the light-emitting portion 300.

The encapsulating substrate 200 then covers the sealant 500, and the sealant hardening mask 100 is installed on the encapsulating substrate 200. At this point, the transmission slit 111 of the sealant hardening mask 100 is disposed in correspondence to the position of the sealant 500.

Upon laser irradiation in this state, the laser is irradiated through the transmission slit 111, thus hardening the sealant 500. The amounts of laser irradiation onto the straight line portions 111a and to the corner portions 111b of the transmission slit 111 become similar to each other due to the partial shielding portion 130, thereby allowing complete uniform hardening, and thus obtaining a stable sealing structure.

The partial shielding portion 130 including the bar patterns may be modified to various shapes as shown in FIGS. 3A thru 3D, which show possible variations of the mask shown in FIG. 1.

Figure 3A:
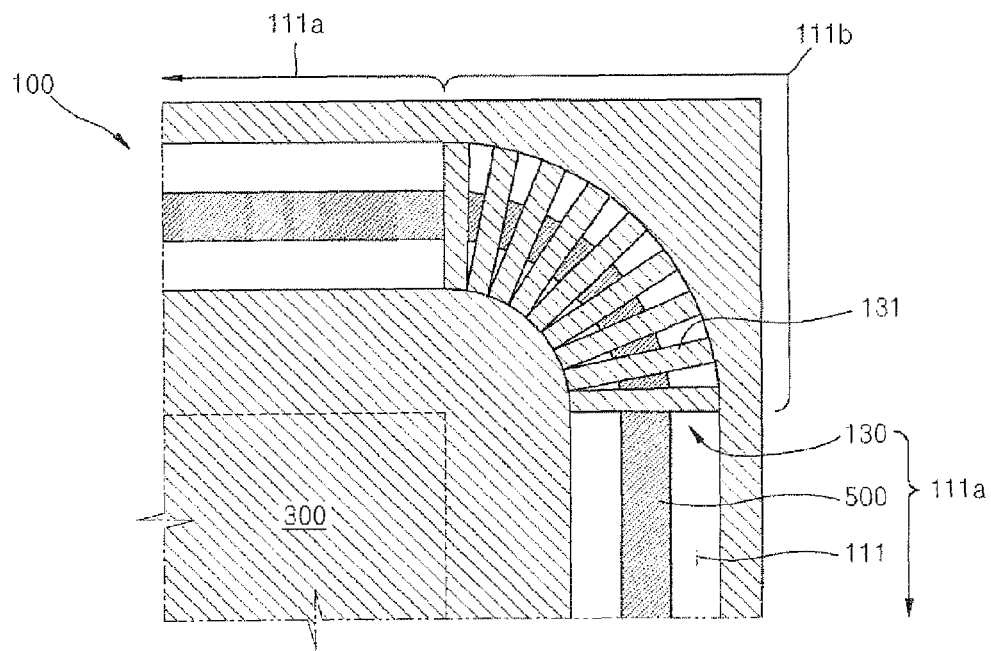
FIGS. 3A thru 3D show possible variations of the mask shown in FIG. 1.

As shown in FIG. 3A, bar patterns 131 forming the partial shielding portion 130 may be identically formed in a long rectangular shape. Thus, the amount of laser irradiation onto the corner portions 111b of the transmission slit 111 may be reduced almost to the amount of irradiation onto to the straight line portions 111a of the transmission slit 111.

Figure 3B:
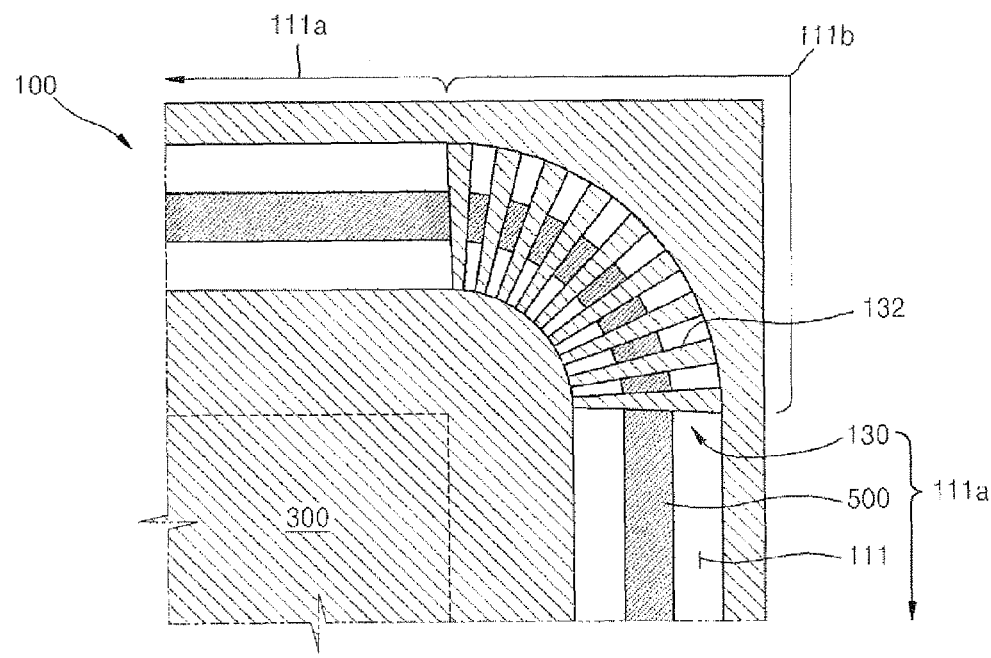

Alternatively, as shown in FIG. 3B, bar patterns 132 may be formed in a trapezoid shape such that the width of an inner side (i.e., a side close to the light-emitting portion 300) may be less than the width of an opposite side. Since, with the bar patterns 131 in the long rectangular shape shown in FIG. 3A, the transmission slit 111 on an inner side close to the light-emitting portion 300 is narrower than the transmission slit 111 on an outer side opposite to the inner side, resulting in a difference in the amount of laser irradiation between the inner side and the outer side, the bar patterns 132 of FIG. 3B are formed in a trapezoid shape so as to prevent such a difference, and the transmission slit 111 between the bar patterns 132 are almost in a rectangular shape. Therefore, the amounts of laser irradiation onto an inner side and an outer side, and also onto the corner portions 111b, can be adjusted so as to be uniform.

Figure 3C:
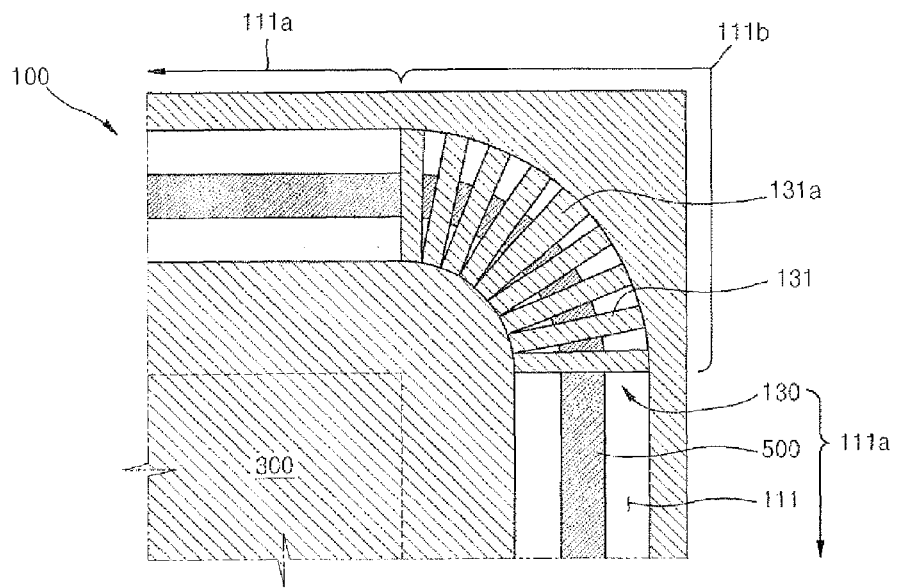

FIG. 3C shows an additional variation of FIG. 3A in which the width of a bar pattern 131a in the center of the corner portion 111b among the bar patterns 131 is larger than the width of any other bar pattern. This structure considers accounts for the fact that, because the laser irradiator decelerates when entering the corner portions 111b from the straight line portions 111a and then accelerates after passing through the center, the laser irradiator stays for the longest time in the center. In other words, if the laser irradiator stays for the longest time in the center, the amount of laser irradiation also increases. Taking this point into account, the width of the bar pattern 131a in the center is larger than the width of any other bar pattern.

Figure 3D:
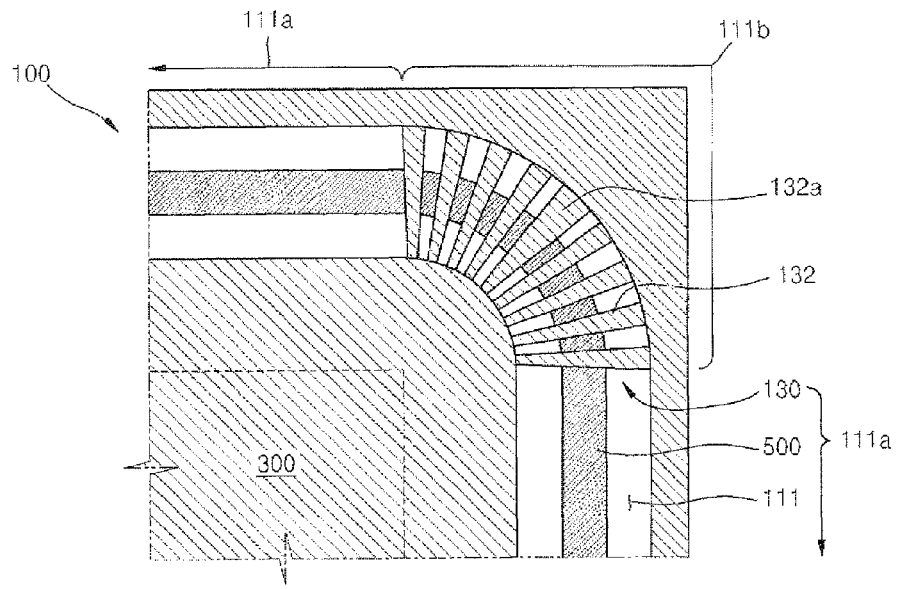

FIG. 3D shows an additional variation of FIG. 3B in which the width of a bar pattern 132a in the center among the bar patterns 132 is larger than the width of any other bar pattern based on the same principle as in FIG. 3C.

By using the sealant hardening mask 100 having the partial shielding portion 130 in the aforementioned various bar patterns, uniform ultraviolet irradiation can be achieved.

Figure 4:
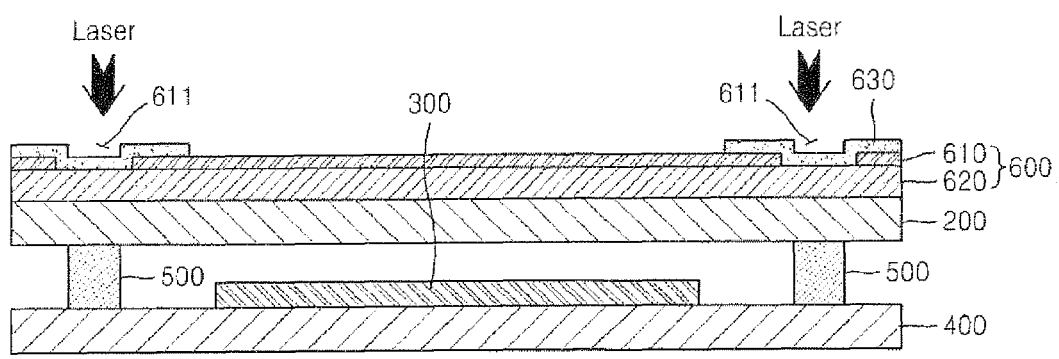
FIG. 4 is a cross-sectional view for describing a method of manufacturing a flat display device using a mask for hardening a sealant according to another embodiment of the present invention.
Figure 5:
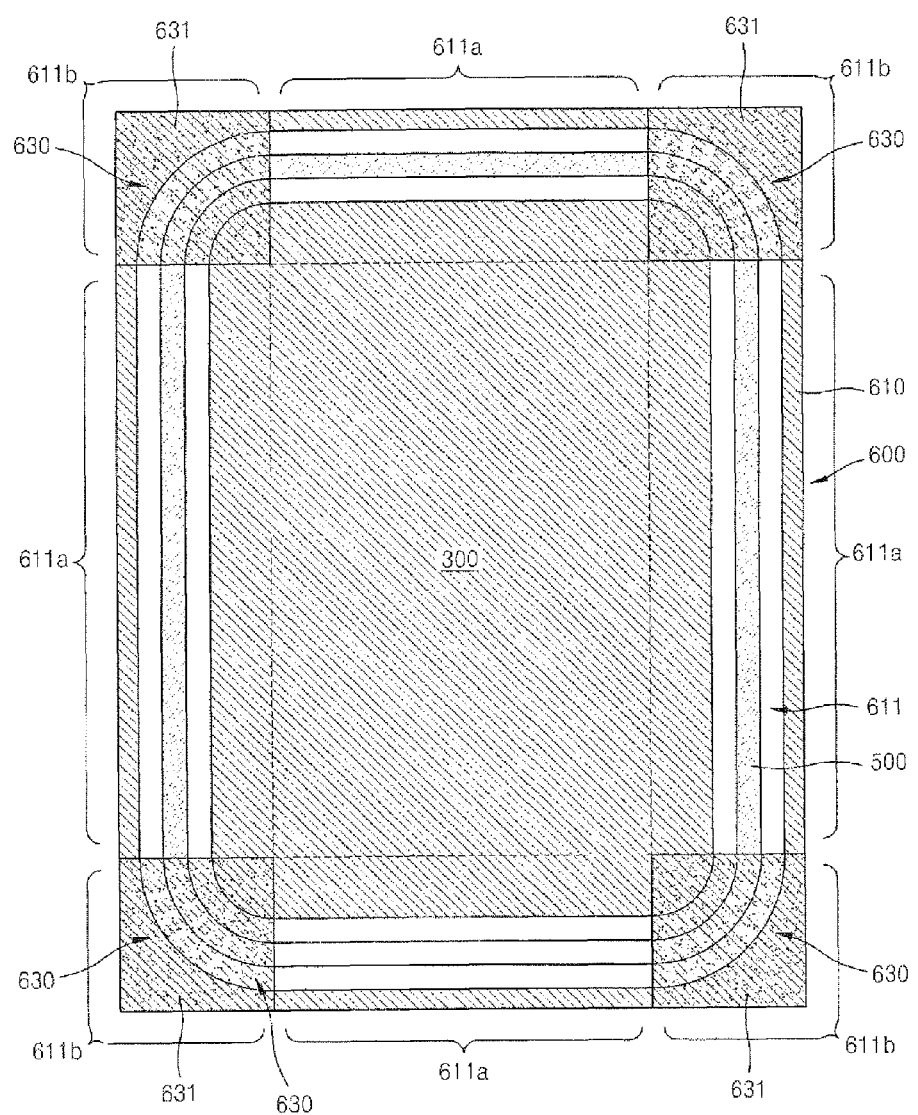
FIG. 5 is a plan view of FIG. 4.

FIG. 4 is a cross-sectional views for describing a method of manufacturing a flat display device using a mask for hardening a sealant according to another embodiment of the present invention, and FIG. 5 is a plan view of FIG. 4.

In the current embodiment, the same reference numerals used in the foregoing embodiment will refer to the same members in the foregoing embodiment.

The sealant hardening mask 600 according to the current embodiment includes a main body in which a transmission slit 611 is formed so as to pass laser therethrough. In other words, the main body is structured such that shielding patterns 610 forming the transmission slit 611 are formed on a transparent base 620, and thus laser irradiated from a laser irradiator (not shown) is irradiated onto the sealant 500 through the transmission slit 611. The transmission slit 611 is formed in correspondence to the shape of the sealant 500.

In round-shaped corner portions 611b of the transmission slit 611, a partial shielding portion 630 for partially shielding the laser is formed. The partial shielding portion 630 according to the current embodiment includes a low-transmissivity layer 631 (FIG. 5) for covering the transmission slit 611, rather than bar patterns used in the previous embodiment.

That is, the low-transmissivity layer 631 is made of translucent materials which lower the transmissivity of the laser, and is formed on the transmission slit 611, thereby reducing the amount of irradiation of the laser.

In this way, the amount of laser transmission is reduced by the partial shielding portion 630 in corner portions 611b when compared to straight line portions 611a, leading to reduction in the amount of laser irradiation onto corresponding regions of the sealant 500. Therefore, by covering the corner portions 611b onto which an amount of laser is irradiated, that amount of laser being larger than the amount of laser irradiated onto the straight line portions 611a, the corner portions 611 being covered by the low-transmissivity layer 631, the level of the amount of laser irradiation onto the corner portions 611b is adjusted to a level similar to the level of the amount of laser irradiation onto the straight line portions 611a, thus reducing a deviation in the amount of laser irradiation.

Accordingly, by using the sealant hardening mask 600, the amount of laser irradiation through the transmission slit 611 is adjusted to a uniform level across the entire regions of the sealant 500, thereby solving a problem such as the generation of bubbles caused by an excessive amount of laser irradiation onto the corner portions 611b.

The flat display device may be manufactured using the above-described sealant hardening mask 600 as described below.

First, the light-emitting portion 300 is formed on the substrate 400, and the sealant 500 is applied around the light-emitting portion 300.

The encapsulating substrate 200 then covers the sealant 500, and the sealant hardening mask 600, wherein the low-transmissivity layer 631 is formed, is installed on the encapsulating substrate 200. At this point, the transmission slit 611 of the sealant hardening mask 600 is disposed in correspondence to the position of the sealant 500.

Upon laser irradiation in this state, the laser is irradiated through the transmission slit 611, thus hardening the sealant 500. The respective amounts of laser irradiation onto the straight line portions 611a and onto the corner portions 611b of the transmission slit 611 become similar to each other due to the partial shielding portion 630, including the low-transmissivity layer 631, allowing complete uniform hardening, and thus obtaining a stable sealing structure.

Figure 6A:
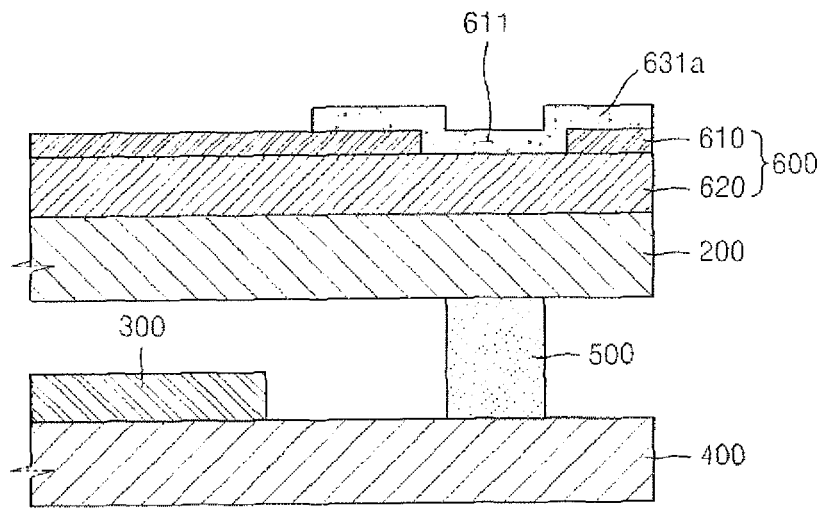
FIGS. 6A and 6B show possible variations of the mask shown in FIG. 4.
Figure 6B:
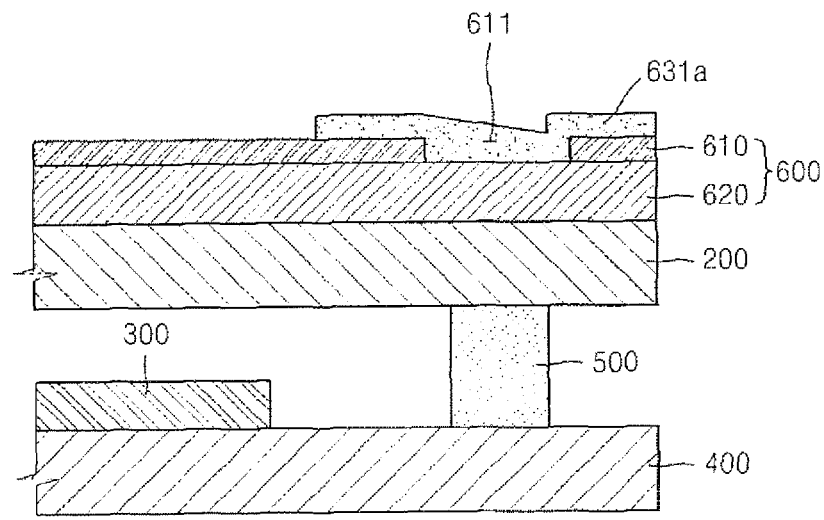

The low-transmissivity layer 631 may be modified to various shapes as shown in FIGS. 6A and 6B, which show possible variations of the mask shown in FIG. 4.

As shown in FIG. 6A, a low-transmissivity layer 631a may be formed so as to be uniform in thickness.

Alternatively, as shown in FIG. 6B, a low-transmissivity layer 631b may be formed such that a thickness on an inner side (i.e., a side close to the light-emitting portion 300) may be different from the thickness on an opposite side. Since an area of the inner side close to the light-emitting portion 300 is less than the area of an outer side opposite the inner side, the amount of laser irradiation per unit area on the inner side may be larger than that on the outer side. To offset such a difference, the low-transmissivity layer 631a is formed such that the thickness on the inner side is larger than the thickness on the outer side, thereby adjusting the amounts of laser irradiation to a uniform level across the inner side and the outer side of the corner portion 611b.

Accordingly, uniform ultraviolet irradiation can be achieved by using the sealant hardening mask 600, including the partial shielding portion 630, and including the above-described various low-transmissivity layers 631.

As can be appreciated from the foregoing description, a sealant hardening mask according to the present invention reduces a deviation in the amount of laser irradiation with a partial shielding portion in corner portions where the amount of laser irradiation is relatively large. Therefore, by using the sealant hardening mask, a sealant can be hardened uniformly, and thus a stable encapsulating structure can be guaranteed.

While the present invention has been particularly shown and described with reference to exemplary embodiments thereof, it will be understood by those of ordinary skill in the art that various changes in form and detail may be made therein without departing from the spirit and scope of the present invention as defined by the following claims. Accordingly, the true scope of the present invention should be defined by the appended claims.

What is claimed is:

1. A mask for hardening a sealant, the mask comprising:
    a transmission slit geometrically corresponding to a shape of a sealant enclosing a light-emitting portion formed on a substrate and including a plurality of straight line portions connected together by intermediate corner portions; and
    a partial shielding portion disposed in corresponding ones of the corner portions to partially shield the transmission slit.

2. The mask of claim 1, wherein the corner portions are in a round shape.

3. The mask of claim 1, wherein the partial shielding portion comprises a plurality of bar patterns provided in the corner portions of the transmission slit.

4. The mask of claim 3, wherein the plurality of bar patterns are shaped such that a width of a side close to the light-emitting portion is substantially equal to a width of an opposite side.

5. The mask of claim 3, wherein the plurality of bar patterns are shaped such that a width of a side close to the light-emitting portion is less than a width of an opposite side.

6. The mask of claim 3, wherein a width of a bar pattern disposed in a center of the corner portion among the plurality of bar patterns is larger than widths of remaining bar patterns.

7. The mask of claim 1, wherein the partial shielding portion comprises a low-transmissivity layer which reduces transmissivity by covering the transmission slit in corner portions.

8. The mask of claim 7, wherein the low-transmissivity layer is shaped such that a thickness of a side close to the light-emitting portion is substantially equal to a thickness of an opposite side.

9. The mask of claim 7, wherein the low-transmissivity layer is shaped such that a thickness of a side close to the light-emitting portion is larger than a thickness of an opposite side.

10. A method of manufacturing a flat display panel, the method comprising the steps of:
    applying a sealant around a light-emitting portion formed on a substrate, and covering the sealant with an encapsulating substrate;
    installing a mask for hardening the sealant on the encapsulating substrate, the mask comprising a transmission slit which geometrically corresponds to a shape of the sealant and a partial shielding portion partially shielding the transmission slit; and
    hardening the sealant by irradiating laser onto the sealant through the transmission slit.

11. The method of claim 10, wherein the transmission slit comprises a plurality of straight line portions and corner portions which connect the straight line portions, and the partial shielding portion is provided in the corner portions.

12. The method of claim 11, wherein the corner portions are in a round shape.

13. The method of claim 11, wherein the partial shielding portion comprises a plurality of bar patterns provided in the corner portions of the transmission slit.

14. The method of claim 13, wherein the plurality of bar patterns are shaped such that a width of a side close to the light-emitting portion is substantially equal to a width of an opposite side.

15. The method of claim 13, wherein the plurality of bar patterns are shaped such that a width of a side close to the light-emitting portion is less than a width of an opposite side.

16. The method of claim 13, wherein a width of a bar pattern disposed in a center of the corner portion among the plurality of bar patterns is larger than widths of remaining bar patterns.

17. The method of claim 11, wherein the partial shielding portion comprises a low-transmissivity layer which reduces transmissivity by covering the transmission slit in corner portions.

18. The method of claim 17, wherein the low-transmissivity layer is shaped such that a thickness of a side close to the light-emitting portion is substantially equal to a thickness of an opposite side.

19. The method of claim 17, wherein the low-transmissivity layer is shaped such that a thickness of a side close to the light-emitting portion is larger than a thickness of an opposite side.

* * * * *